United States Patent [19]

Kaplanis

[11] Patent Number: 4,797,772
[45] Date of Patent: Jan. 10, 1989

[54] IMMERSION DETECTOR CIRCUIT INTERRUPTER

[75] Inventor: Kostas Kaplanis, Fort Wayne, Ind.

[73] Assignee: Patton Electric Company, Inc., New Haven, Ind.

[21] Appl. No.: 21,185

[22] Filed: Mar. 3, 1987

[51] Int. Cl.$^4$ ............................................. H02H 3/16
[52] U.S. Cl. ...................................... 361/42; 307/118; 307/326; 340/604
[58] Field of Search ........................... 361/42–50, 361/91, 86, 102; 307/118, 132 M, 140, 326–328; 340/604; 328/4

[56] References Cited

U.S. PATENT DOCUMENTS

| | | | |
|---|---|---|---|
| 2,844,765 | 7/1958 | Sosnoski | 361/42 |
| 3,213,323 | 10/1965 | Circle | 361/42 |
| 3,229,163 | 1/1963 | Rogers, Sr. | 361/42 |
| 3,242,382 | 3/1966 | Rogers, Sr. | 361/49 |
| 3,253,188 | 5/1966 | Nissel | 361/42 |
| 3,287,603 | 11/1966 | Sosnoski | 361/42 |
| 3,436,599 | 4/1969 | Rogers, Sr. | 361/42 |
| 3,441,801 | 4/1969 | Kraus, Sr. | 361/42 |
| 3,450,947 | 6/1969 | Rogers, Sr. | 361/42 |
| 3,500,059 | 3/1970 | Fielding et al. | 307/118 |
| 3,515,942 | 6/1970 | Gordon | 361/42 |
| 3,525,902 | 8/1970 | Davidson et al. | 307/118 |
| 3,665,252 | 5/1972 | Rogers, Sr. et al. | 361/42 |
| 3,700,967 | 10/1972 | Hoss | 361/46 |
| 3,728,581 | 4/1973 | Adamo . | |
| 3,813,579 | 5/1974 | Doyle et al. | 361/46 |
| 3,895,263 | 7/1975 | Clark . | |
| 3,944,888 | 3/1976 | Clark . | |
| 3,944,891 | 3/1976 | McDonald et al. | 361/42 |
| 4,068,276 | 1/1978 | Pintell | 361/46 |
| 4,087,846 | 5/1978 | Hughes et al. | 361/42 |
| 4,135,222 | 1/1979 | Siepmann | 361/46 X |
| 4,216,515 | 8/1980 | Van Zeeland | 361/45 |
| 4,227,190 | 10/1980 | Kelley et al. | 340/604 |
| 4,263,637 | 4/1981 | Draper et al. | 361/45 |
| 4,270,158 | 5/1981 | Gilardoni et al. | 361/42 |
| 4,347,541 | 8/1982 | Chen et al. | 361/50 |
| 4,375,660 | 3/1983 | Tate et al. | 361/42 X |
| 4,412,193 | 10/1983 | Bienwald et al. | 361/42 |
| 4,447,844 | 5/1984 | Schossow et al. | 361/77 |
| 4,464,582 | 8/1984 | Aragaki et al. | 307/118 |
| 4,568,997 | 2/1986 | Bienwald et al. | 361/42 |
| 4,574,324 | 3/1986 | Pachard | 361/46 |
| 4,580,186 | 4/1986 | Parker et al. | 361/42 |
| 4,598,331 | 7/1986 | Legatti | 361/46 |
| 4,618,907 | 10/1986 | Leopold | 361/45 |

FOREIGN PATENT DOCUMENTS 892607 12/1981 U.S.S.R. .

Primary Examiner—G. P. Tolin
Assistant Examiner—A. Jonathan Wysocki
Attorney, Agent, or Firm—George Pappas

[57] ABSTRACT

An immersion detector circuit interrupter having a sensor located around the electrical components of an appliance and a relay for interrupting the delivery of alternating current to the appliance whenever the sensor conducts a current at a predetermined voltage. The sensor is connected in series with a zener diode, a regular diode, the coil of the relay and to another two diodes which are connected to two alternating current conductors which provide electrical current to the appliance. The sensor is generally always at an electrical potential opposite or substantially different than the electrical potential of the electrical components at any particular point in time. When a conductive path it provided between the electrical components and the sensor, such as when the appliance is immersed in water, as soon as the predetermined breakdown voltage of the zener diode is reached, a current travels through the coil of the relay and to either of the two alternating current conductors thereby actuating the relay switches and interrupting current from being delivered to the appliance. In their actuated state, the switches provide rectified current to the coil and capacitor through two diodes. The diode connected next to the zener diode is situated in opposite polarity to the diodes providing rectified current thereby preventing rectified current from being delivered to the sensor. A light emitting diode is energized when the switches are actuated.

29 Claims, 2 Drawing Sheets

IMMERSION DETECTOR CIRCUIT INTERRUPTER

BACKGROUND OF THE INVENTION

This invention generally relates to a safety circuit or a circuit interrupter which interrupts the delivery of alternating current to an appliance whenever a ground fault occurs in the appliance such as when the appliance is accidently dropped into water. More specifically, a sensor is provided surrounding the electrical components of the appliance so that when the appliance is accidently dropped or immersed into water the sensor conducts electrical current from the electrical components through the water and energizes a relay which disconnects the alternating current from the appliance. A latching circuit is then provided to retain the relay energized and the delivery of alternating current to the appliance interrupted.

It is known that in the past people have placed radios near their swimming pools or bath tub while swimming or taking a bath respectively. Further, many people utilize and place small heaters on the side of their bath tubes or sinks for the purpose of keeping warm while taking a bath or while being in the bathroom. Many other electrical appliances such as fans, de-humidifiers, air filters, hair dryers, hair curlers, razors, and other personal care appliances are also used near bath tubes or other bodies of water. Such use or placement of electrical appliances near such bodies of water has in the past proved to be dangerous because the appliances are often accidently knocked or dropped into the water causing an electrical short circuit which in turn creates an electrical field in the water which can shock and often severly injure people within the water. Further yet, larger electrical appliances such as washers and dryers are often times placed in basements which may flood and thereby, again, create an electrical field in the water which can injure people who come in contact with it. Even with greater public awareness people often times disregard warnings and still place and use electrical appliances near water and in basements which are likely to flood.

One solution to this problem has been to use a ground fault interrupter (GFI) whereby current is interrupted and protection is provided for such accidents. GFI's are now often used in bathrooms and kitchen receptacles and in circuit boxes in many homes. GFI's however, are expensive and on occasions may fail. Further, many older homes wired prior to GFI's coming into general use have absolutely no protection for preventing the accidents mentioned above from occurring.

Another solution to the problem of electrical shock caused by electrical appliances has been to provide electrical ground fault protective circuits which utilize an isolation transformer so as to isolate the ground potential of the appliance and thus prevent a ground fault from occurring. Examples of such uses are shown in U.S. Pat. Nos. 3,436,599, 3,229,163, and 3,242,382. Isolation transformers, however, are bulky and substantially add to the cost of the safety circuit. Furthermore, they do not protect the user totally without failing in conditions such as when the appliance is accidently immersed in water.

Another solution to the problem of electrical shock caused by electrical appliances falling into or being immersed in water has been to incorporate an immersion detection circuit interrupter (IDCI) within the plug of the electrical appliance or within the appliance itself. One such IDCI is disclosed in U.S. Pat. No. 4,464,582. The IDCI disclosed therein, however, utilizes a triac to energize a relay and disconnect the alternating power source from the appliance. This makes the IDCI relatively expensive and impractical to use.

Accordingly, there is a need for providing an inexpensive immersion detector circuit interrupter for use with electrical appliances which are used near bodies of water so as to protect individuals from electrical shock which may occur by the appliances falling within the bodies of water.

SUMMARY OF THE INVENTION

It is the principle object of the present invention to overcome the above discussed disadvantages and dangers associated with electrical appliances which are placed or used by people near water and by the prior art solutions for interrupting the flow of electrical current to the appliance when the appliance is accidently immersed in a body of water. More specifically, it is the object of this invention to provide an immersion detection circuit interrupter which is relatively inexpensive, which can be used with many different electrical appliances and which is more sensitive than the prior art immersion detection circuit interrupters.

The objects of the invention are generally obtained by providing a sensor near or around the eletrical components of the appliance which is always at an electrical potential opposite or substantially different than the electrical potential which the electrical components are at at any particular point in time. Further, the objects of the present invention are obtained by substantially surrounding the electrical components of the appliance by the sensor so that the sensor first comes in contact with the water prior to the electrical components coming in contact therewith. The sensor is connected in series with a zener diode, a diode, a relay coil and a capacitor, and with two other diodes which are connected to the alternating current conductive lines. The diodes connected to the alternating current conductive lines are parallel with each other. The relay coil actuates two switches which disconnect and prevent alternating current from being delivered to the electrical appliance. In their actuated state the two switches power a latching circuit which provides rectified current to the coil and capacitor for retaining the switches in their actuated state until the plug of the appliance is disconnected from the alternating current power source. A light emitting diode is also energized when the switches are actuated so as to signal that the circuit interrupter has been triggered. The diode connected to the zener diode and in series therewith prevents current from being delivered to the sensor while the coil is energized and the switches remain actuated through the use of the rectified current.

In one form thereof, the invention is a circuit interrupter for interrupting the delivery of alternating current to an electrical appliance through a plurality of conductors. The circuit interrupter includes switches which are connected to each of the conductors for interrupting the delivery of alternating current through the conductors and to the appliance. A sensor is located substantially near the appliance for conducting electrical current and a coil is connected to the sensor for actuating the switches and interrupting the delivery of alternating current to the appliance when the coil is energized. A plurality of rectifiers are connected in series with the coil and the sensor at the other end of the sensor and each rectifier is connected in a parallel fashion to each of the respective conductors. The rectifiers conduct current in one direction through the coil and the sensor and prevent a short circuit from occurring between the conductors. A latch is provided for retaining the switches actuated and the delivery of alternating current to the appliance interrupted after the coil actuates the switches.

In one form thereof, the invention is a circuit interrupter for interrupting the delivery of alternating current to an electrical appliance through a plurality of conductors. The circuit interrupter includes switches connected to each of the conductors for interrupting the delivery of alternating current through the conductors to the appliance. A sensor is located substantially near the appliance for conducting electrical current and a coil is connected to the sensor for actuating the switches and interrupting the delivery of alternating current to the appliance when the coil is energized. A plurality of rectifiers are connected in series with the coil and the sensor at the other end of the sensor and each rectifier is connected in a parallel fashion to each of the respective conductors between the switches and the appliance. The rectifiers conduct current in one direction through the coil and sensor and prevent a short circuit between the conductors. A latch is provided for retaining the switches actuated and the delivery of alternating current to the appliance interrupted after the coil actuates the switches.

In one form thereof, the invention is a circuit interrupter for interrupting the delivery of alternating current to an electrical appliance through two conductors. The circuit interrupter includes switches connected to each of the two conductors for interrupting the delivery of alternating current through the conductors and to the appliance. A sensor is located substantially near the appliance for conducting electrical current and is connected to a coil which actuates the switches interrupting the delivery of alternating current to the appliance when the coil is energized. Two first rectifiers are connected in series with the coil and the sensor at the other end of the sensor and each of the first rectifiers are connected in a parallel fashion to the respective two conductors between the switches and the appliance. The two first rectifiers are provided for conducting in one direction through the coil and the sensor and for preventing a short circuit from occurring between the conductors. A latch is provided for retaining the switches actuated and the delivery of alternating current to the appliance interrupted after the coil actuates the switches. The switches are adapted in their actuated state to provide alternating current to the latch through two poles. The latch includes two second rectifiers each connected to one of the poles and to opposite ends of the coil. The second rectifiers are provided for conducting rectified current in one direction through the coil thereby retaining the coil energized, the switches actuated and the delivery of alternating current to the appliance interrupted as long as the alternating current is provided to the switches. A third rectifier is connected to the sensor and in series with the coil for conducting current in the opposite direction to the second rectifiers and for preventing current flow to the sensor when the coil is retained energized with rectified current.

BRIEF DESCRIPTION OF THE DRAWINGS

The above mentioned and other features and objects of this invention and the manner of obtaining them will become more apparent and the invention itself will be better understood by reference to the following description of the embodiments of the invention taken in conjunction with the accompanying drawings, wherein.

Corresponding reference characters indicate corresponding parts throughout the several views of the drawings.

DETAILED DESCRIPTION OF THE PREFERRED EMBODIMENTS

Figure 1:
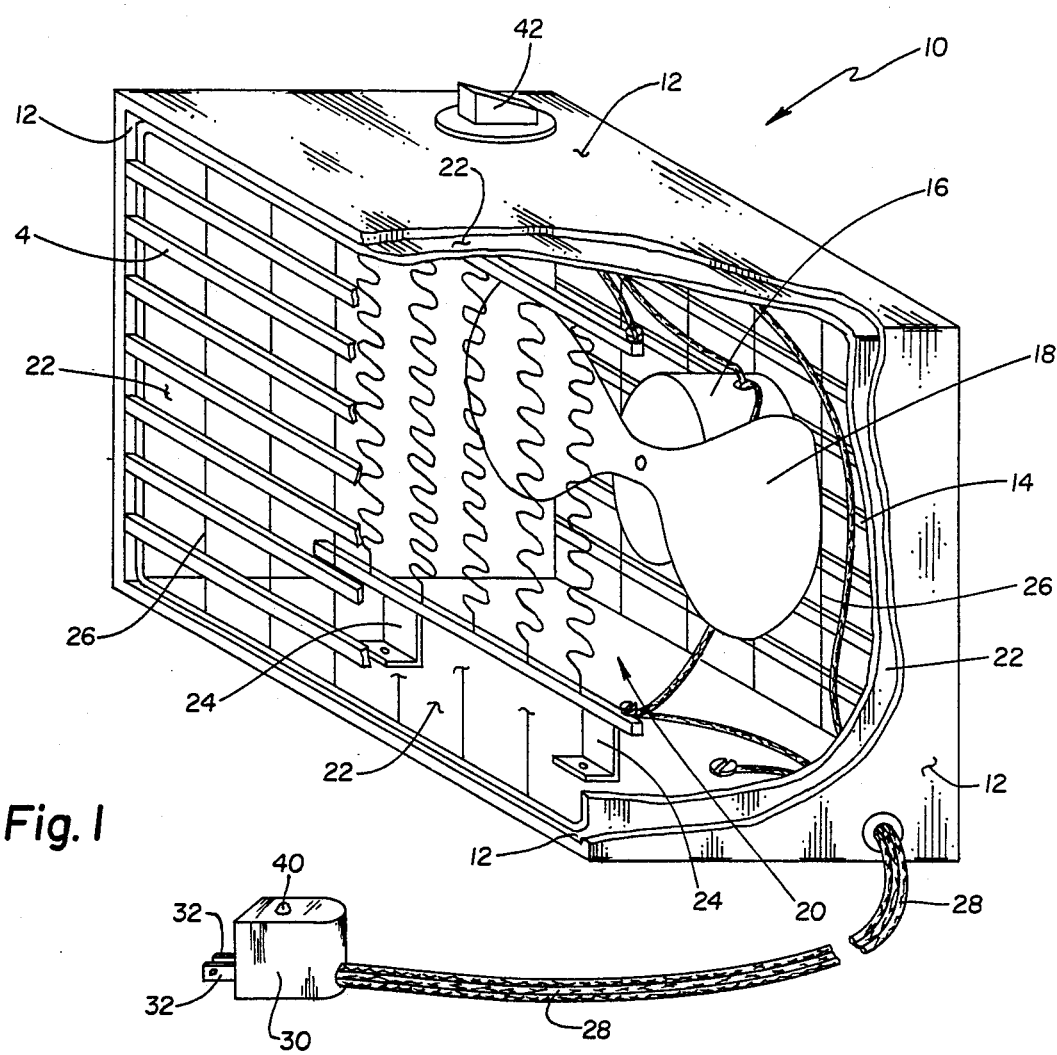
FIG. 1 is a perspective cut-away view of a heater appliance utilizing a sensor and a circuit interrupter according to the present invention.

Referring to FIG. 1, there is generally shown an appliance or heater 10. Heater 10 has a housing made up of four solid sides 12 and two vented sides which have a plurality of ribs 14 (one rib 14 is marked on each of the vented sides) so as so allow air to pass through heater 10. Within heater 10 there is mounted a motor 16 for driving a fan blade 18 and forcing air across the heating element generally indicated as 20. A sensor means or a conductive sensor plate 22 is located substantially near the electrical components of heater 10 and, more specifically, is situated so as to surround or enclose the electrical components of heater 10 as shown in FIG. 1. Conductive sensor plate 22 is located within the heater housing and is not electrically connected to any of the electrical components within heater 10. To this end, L-shaped legs 24 which are connected to sensor plate 22 and upon which there is mounted heating element 20 are non-conductive. So as to further better surround the electrical components within heater 10, conductive sensor wires 26 (one conductive sensor wire is labeled 26 on each vented side of heater 10) are provided on each vented side of heater 10 and are connected to conductive sensor plate 22.

The electrical components of heater 10 are powered with alternating current which is delivered thereto through conductors or wires 28. Wires 28 lead to and are connected to a plug 30 having at least two prongs 32. Prongs 32 are received within a common alternating current receptacle 36 which is connected to an alternating current source 34.

A circuit interrupter generally indicated as 38 is provided within plug 30 and is adapted to interrupt the delivery of alternating current to heater 10 whenever a ground fault occurs and the sensor means including sensor plate 22 and wires 26 conduct the ground faulted current. A signal means or a light emitting source such as a light emitting diode 40 is provided on plug 30 for signaling or indicating whenever the alternating current delivered to heater 10 has been interrupted through the use of circuit interrupter 38. It should be noted that the signal means can also be a sound emitting source such as an electrical bell 41 shown in FIG. 3. It should also be noted that heater 10 is selectively energized and de-energized through the use of heater switch 42 which is partially also within and surrounded by sensor plate 22. Circuit interrupter 38 will be described hereinbelow.

Figure 2:
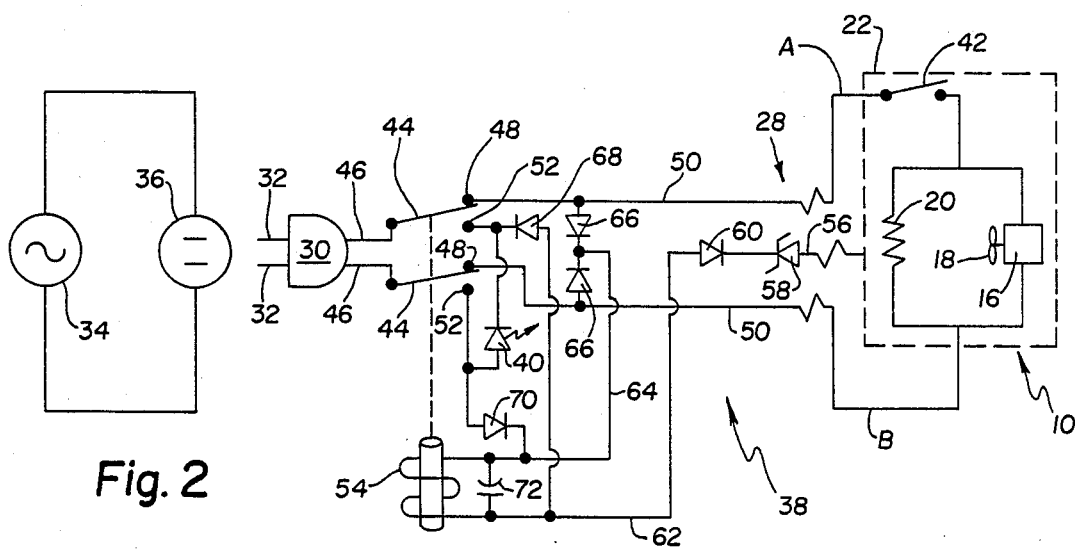
FIG. 2 is an electrical schematic of the circuit interrupter and electrical components of the appliance shown in FIG. 1; and, FIG. 3 is an electrical schematic of a second embodiment of the circuit interrupter and electrical components of the appliance shown in FIG. 1.

As shown in FIG. 2, circuit interrupter 38 includes switch means or switches 44 shown in their normal operating position. Switches 44 are connected to conductors 46 carrying alternating current and, as shown in their normal operating position, deliver alternating current to heater 10 through poles 48 and conductors or wires 50. When switches 44 are actuated by energizing coil 54 they make contact with and provide alternating current from conductors 46 to poles 52. It should be noted that coil 54 together with switches 44 are more commonly known as a double-pole, double-throw relay.

Coil 54 is connected to conductive sensor plate 22 through conductor or wire 62, rectifier means or diode 60, zener means or zener diode 58 and conductor or wire 56. Zener diode 58 which, in essence, is connected in series with diode 60 has its anode connected to sensor 22 so that it will conduct and allow current to flow therethrough towards diode 60 only when its breakdown voltage is reaches or is applied thereto. Diode 60, on the other hand, has its cathode end connected to zener diode 58 so that it will readily be forward biased to allow current flow in one direction towards coil 54 and not towards zener diode 58 and sensor 22.

The other end of coil 54 is connected through conductor or wire 64 to the cathode end of two rectifier means or diodes 66. The anode end of diodes 66 are connected to a respective alternating current carrying conductor 50. Thus, diodes 66 are adapted to be forward biased and carry current from coil 54 to either of alternating current carrying lines 50. Further, because diodes 66 are connected to each other oppositely or, as shown, cathode to cathode, a short circuit between conductors 50 is prevented. It should be noted that diodes 66 in essence are connected in series with coil 54 and are further connected in parallel with each other to respective conductors 50.

Circuit interrupter 38 also includes latch means for keeping or retaining switches 44 actuated or out of their normal operating position and for delivering current to poles 52 after switches 44 are actuated out of their normal operating position and against poles 52. The latch means includes rectifier means or diodes 68 and 70 which are connected in series with coil 54 between poles 52. The anode of diode 68 is connected to conductor 62 and thus to one end of coil 54 while the cathode end of diode 68 is connected to pole 52. The cathode of diode 70 is connected to conductor 64 or the other end of coil 54 while the anode of diode 70 is connected to the other pole 52. Accordingly, when switches 44 are actuated and provide alternating current to poles 52, diodes 68 and 70 provide half wave rectified current to coil 54. Capacitor means or capacitor 72 is connected to conductors 64 and 62 in parallel with coil 54 so as to keep coil 54 energized, in a known and customary fashion, when half or full wave rectified current is delivered thereto.

A light emitting diode 40 is connected to poles 52 and is energized emitting light whenever switches 44 are actuated and provide alternating current to poles 52.

In operation, circuit interrupter 38 interrupts the delivery of alternating current to conductors 50 and heater 10 by actuating switches 44. That is, in the event that a ground fault occurs, such as when heater 10 is accidently dropped into water, alternating current is delivered from any of the electrical components including switch 42, heating element 20 or motor 16 or either of conductors 50 through the water to sensor 22 whereby circuit interrupter 38 actuates switches 44. It should be noted that, depending on how plug 30 is inserted into receptacle 36 and on the way receptacle 36 is wired internally, one of conductors 50 will be "hot" while the other will be "neutral".

In the event that conductor 50 indicated as A is hot, as soon as electrical contact is made between the electrical components and sensor 22, sensor 22 will conduct the positive portion of the alternating current delivering it to zener diode 58. Upon reaching the breakdown voltage, zener diode 58 allows current to flow therethrough to diode 60 which is then forward biased and which allows current to continue to flow to coil 54 and capacitor 62. Current flowing through coil 54 also flows through conductor 64 and through the diode 66 which is connected to the neutral conductor 50 which in this case is indicated as B.

It should be noted that if conductor 50 indicated as B was the hot line, the current flowing through sensor 22, zener diode 58, diode 60, conductor 62, coil 54, and conductor 64 would flow through diode 66 connected to the neutral conductor 50 which is indicated as A.

Accordingly, the above described current flowing from sensor 22 to the neutral conductor causes coil 54 to be energized and, further, simultaneously charges capacitor 72. When coil 54 is sufficiently energized it causes switches 44 to be actuated or pulled down so as to interrupt the delivery of alternating current to heater 10 through conductors 50. However, as soon as switches 44 are disconnected from poles 48, current ceases to flow to coil 54 from sensor 22. Thus, capacitor 72, during this switching time interval, discharges and retains coil 54 energized until switches 44 make contact with poles 52.

When switches 44 make contact with poles 52, diode 68 is forward biased and delivers half-wave rectified current to conductor 62 through coil 54 and thereafter through diode 70 which is also forward biased to pole 52. It should be noted that, because diode 60 is reverse biased with respect to the rectified current traveling through diodes 68, coil 54 and through diode 70, rectified current is prevented from being delivered to sensor 22 and to any water which sensor 22 may be in contact with. Further yet, capacitor 72 charges and discharges as the rectified current is applied thereto so as to keep coil 54 energized and switches 44 actuated. Thus, switches 44 remain actuated until plug 30 is disconnected from receptacle 36 and alternating current is stopped from being delivered to switches 44 and poles 52.

When switches 44 are actuated, light emitting diode 40 is also energized and is thus eluminated so as to signal that the switches have been actuated and that alternating current has been interrupted from heater 10. Light emitting diode 40 remains eluminated as long as switches 44 remain actuated.

Figure 3:
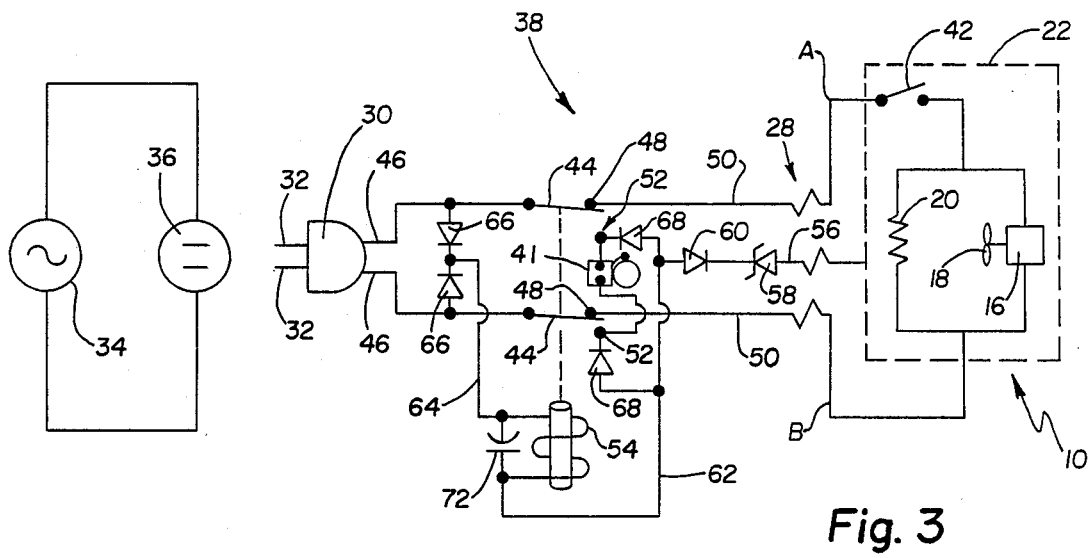

In a second embodiment, as shown in FIG. 3, diodes 66 are connected to conductors 46 between plug 30 and switches 44 rather than between switches 44 and heater 10 as shown in FIG. 2. In this embodiment, coil 54 is energized and switches 44 are actuated originally with current flowing through sensor 22, zener diode 58, diode 60, conductor 62, coil 54, and conductor 64 to either of diodes 66 connected to the neutral conductor 46 as described above in the embodiment shown in FIG. 2. However, in the embodiment shown in FIG. 3, because diodes 66 remain connected to conductors 46 even after switches 44 are actuated, the latch means delivers full wave rectified current to coil 54 rather than half wave rectified current, as described above, with respect to the embodiment shown in FIG. 2. More specifically, the embodiment shown in FIG. 3 delivers full wave rectified current to coil 54 and capacitor 72 during its latched state through a full wave rectifier bridge circuit made up of diodes 68 and 66.

It should be understood that, in both embodiments shown in FIGS. 2 and 3, the polarity of zener diode 58 and diodes 60, 66, and 68 and 70 may be reversed and the circuit interrupter 38 will function, as described above, interrupting the delivery of alternating current to heater 10 whenever a conductive path is provided between the electrical components of heater 10 and sensor 22. The difference here is that, when switches 44 are originally actuated, the relevant diodes are forward biased so that current will momentarily flow from sensor 22 through the water and to the electrical components of heater 10 rather than, as described above, in the opposite direction.

Accordingly, it is evident that a safety circuit has herein been described whereby, independent of which conductor 50 ends up being the hot line, if heater 10 is accidently dropped or immersed into water, the conductive path formed between the electrical components of heater 10 and sensor 22 causes the circuit interrupter 38 to interrupt the delivery of alternating current to heater 10 and, further, retains its interrupted state so long as alternating current is delivered to conductors 46. In this fashion electrical shock which may occur by alternating current being delivered through the electrical components and through an individual to another electrical potential such as ground is generally prevented.

It should further be noted that circuit interrupter 38 will function and interrupt the delivery of alternating current to the components of heater 10 whenever sensor 22 comes in contact with something at a different potential than that of sensor 22. That is, sensor 22, by being connected as described hereinabove through zener diode 56, diode 60, relay 54 and diodes 66 to an alternating current source, is continually at an alternating potential. Accordingly, if a current path is provided between sensor 22 and, for example, ground such as when sensor 22 comes in contact with a grounded body of water, circuit interrupter 38 is again triggered interrupting the delivery of alternating current to the components of heater 10. In this regard, it should be understood that circuit interrupter 38 will be triggered whenever sensor 22 comes in contact with something which is at a different potential than its own alternating potential, including another alternating current source at a different frequency than that of current source 34.

While the invention has been described as having specific embodiments, it will be understood that it is capable of further modification. This application is therefore intended to cover any variations, uses, or adaptations of the invention following the general principles thereof and including such departures from the present disclosure as come within known or customary practice in the art to which this invention pertains and fall within the limits of the appended claims.

What is claimed is:

1. A circuit interrupter which interrupts the delivery of alternating current to an electrical appliance through a plurality of conductors, said circuit interrupter comprising:
    switch means connected to each of the conductors for interrupting the delivery of alternating current therethrough to the appliance;
    sensor means located substantially near the appliance for conducting electrical current;
    coil means connected to said sensor means for actuating said switch means and interrupting the delivery of alternating current to the appliance when said coil means is energized;
    a plurality of rectifier means connected in series with said coil means and said sensor means, each rectifier means connected in a parallel fashion to each of the respective conductors for conducting current in one direction through said coil means and said sensor means and for preventing a short circuit between the conductors, whereby current to the appliance is interrupted when said sensor means contacts water or when water bridges the appliance components and said sensor means; and,
    latch means for retaining said switch means actuated and the delivery of alternating current to the appliance interrupted after said coil means actuates said switch means.

2. The circuit interrupter of claim 1, wherein said connection of each said rectifier means to each of the conductors is located between said switch means and the appliance.

3. The circuit interrupter of claim 1, wherein two said switch means are provided for interrupting two conductors delivering alternating current to the appliance, said two switch means, in their actuated state, are adapted to provide alternating current to said latch means through two poles and, wherein said latch means includes two second rectifier means each connected to one of said poles and to opposite ends of said coil means in series therewith for conducting rectified current in one direction through said coil means, thereby retaining said coil means energized, said switch means actuated and the delivery of alternating current to the appliance interrupted as long as alternating current is provided to said switch means.

4. The circuit interrupter of claim 3, further comprising third rectifier means connected to said sensor means in series with said coil means for conducting current in the opposite direction to said second rectifier means and for preventing current flow to said sensor means when said coil means is retained energized with rectified current.

5. The circuit interrupter of claim 4, wherein said first, second, and third rectifier means are diodes.

6. The circuit interrupter of claim 3, further comprising capacitor means connected across said coil means and parallel thereto for aiding in retaining said coil means energized with the rectified current.

7. The circuit interrupter of claim 1, further comprising zener means connected in series between said sensor means and said coil means for allowing current to flow therethrough after a predetermined voltage is applied thereto.

8. The circuit interrupted of claim 1, wherein said sensor means substantially surrounds the electrical components of the appliance.

9. The circuit interrupter of claim 1, further comprising signal means for signaling when said switch means are actuated and the delivery of alternating current to the appliance is interrupted.

10. The circuit interrupter of claim 2, further comprising signal means for signaling when said switch means are actuated and the delivery of alternating current to the appliance is interrupted, said signal means being an electrical sound emitting source connected between said poles.

11. The circuit interrupter of claim 2, further comprising signal means for signaling when said switch means are actuated and the delivery of alternating current to the appliance is interrupted, said signal means being an electrical sound emitting source connected between said poles.

12. A circuit interrupter which interrupts the delivery of alternating current to an electrical appliance through a plurality of conductors, said circuit interrupter comprising:
   switch means connected to each of the conductors for interrupting the delivery of alternating current therethrough to the appliance;
   sensor means located substantially near the appliance for conducting electrical current;
   coil means connected to said sensor means for actuating said switch means and interrupting the delivery of alternating current to the appliance when said coil means is energized;
   a plurality of rectifier means connected in series with said coil means and said sensor means, each rectifier means connected in a parallel fashion to each of the respective conductors between said switch means and the appliance for conducting current in one direction through said coil means and said sensor means and for preventing a short circuit between the conductors, whereby current to the appliance is interrupted when said sensor means contacts water or when water bridges the appliance components and said sensor means; and,
   latch means for retaining said switch means actuated and the delivery of alternating current to the appliance interrupted after said coil means actuates said switch means.

13. The circuit interrupter of claim 12, wherein two said switch means are connected to two conductors and in their actuated state are adapted to provide alternating current to said latch means through two poles, and wherein said latch means includes two second rectifier means each connected to one of said poles and to opposite ends of said coil means in series therewith for conducting rectified current in one direction through said coil means, thereby retaining said coil means energized, said switch means actuated and the delivery of alternating current to the appliance interrupted as long as alternating current is provided to said switch means.

14. The circuit interrupter of claim 13, further comprising third rectifier means connected to said sensor means in series with said coil means for conducting current in the opposite direction to said second rectifier means and for preventing current flow to said sensor means when said coil means is retained energized with rectified current.

15. The circuit interrupter of claim 14, wherein said first, second, and third rectifier means are diodes.

16. The circuit interrupter of claim 13, further comprising capacitor means connected across said coil means and parallel thereto for aiding in retaining said coil means energized with the rectified current.

17. The circuit interrupter of claim 12, further comprising zener means connected in series between said sensor means and said coil means for allowing current to flow therethrough after a predetermined voltage is applied thereto.

18. The circuit interrupted of claim 12, wherein said sensor means substantially surrounds the electrical components of the appliance.

19. The circuit interrupter of claim 12, further comprising signal means for signaling when said switch means are actuated and the delivery of alternating current to the appliance is interrupted.

20. The circuit interrupter of claim 13, further comprising signal means for signaling when said switch means are actuated and the delivery of alternating current to the appliance is interrupted, said signal means being an electrical light emitting source connected between said poles.

21. The circuit interrupter of claim 13, further comprising signal means for signaling when said switch means are actuated and the delivery of alternating current to the appliance is interrupted, said signal means being an electrical sound emitting source connected between said poles.

22. A circuit interrupter which interrupts the delivery of alternating current to an electrical appliance through two conductors, said circuit interrupter comprising:
   switch means connected to each of the two conductors for interrupting the delivery of alternating current therethrough to the appliance;
   sensor means located substantially near the appliance for conducting electrical current;
   coil means connected to said sensor means for actuating said switch means and interrupting the delivery of alternating current to the appliance when said coil means is energized;
   two first rectifier means connected in series with said coil means and said sensor means, each first rectifier means connected in a parallel fashion to the respective two conductors between said switch means and the appliance for conducting in one direction through said coil means and said sensor means and for preventing a said short circuit between the conductors, whereby current to the appliance is interrupted when said sensor means contacts water or when water bridges the appliance components and said sensor means;
   latch means for retaining said switch means actuated and the delivery of alternating current to the appliance interrupted after said coil actuates said switch means and, wherein said switch means, in their actuated state, are adapted to provide alternating current to said latch means through two poles and, wherein said latch means includes two second rectifier means each connected to one of said poles and to opposite ends of said coil means for conducting rectified current in one direction through said coil means thereby retaining said coil means energized, said switch means actuated and the delivery of alternating current to the appliance interrupted as long as the alternating current is provided to said switch means; and,
   third rectifier means connected to said sensor means and in series with said coil means for conducting current in the opposite direction to said second rectifier means and for preventing current flow to said sensor means when said coil means is retained energized with rectified current.

23. The circuit interrupter of claim 22, wherein said first, second, and third rectifier means are diodes.

24. The circuit interrupter of claim 22, further comprising capacitor means connected across said coil means and parallel thereto for aiding in retaining said coil means energized with the rectified current and while said switch means are being actuated.

25. The circuit interrupter of claim 22, further comprising zener means connected in series with said third rectifier means between said coil means and said sensor means for allowing current to flow therethrough and to said coil means after a predetermined voltage is applied thereto.

26. The circuit interrupter of claim 22, wherein said sensor means substantially surrounds the electrical components of the appliance.

27. The circuit interrupter of claim 22, further comprising signal means for signaling when said switch means are actuated and the delivery of alternating current to the appliance is interrupted.

28. The circuit interrupter of claim 27, wherein said signal means is an electrical light emitting source connected between said poles.

29. The circuit interrupter of claim 27, wherein said signal means is an electrical sound emitting source connected between said poles.

* * * * *